(12) United States Patent
Buragohain et al.

(10) Patent No.: US 7,817,563 B1
(45) Date of Patent: Oct. 19, 2010

(54) ADAPTIVE DATA STREAM SAMPLING

(75) Inventors: Chiranjeeb Buragohain, Seattle, WA (US); Peter F. Hill, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 285 days.

(21) Appl. No.: 11/768,759

(22) Filed: Jun. 26, 2007

(51) Int. Cl.
*G01R 31/08* (2006.01)

(52) U.S. Cl. ..................................... 370/241
(58) Field of Classification Search ............... None
See application file for complete search history.

(56) References Cited

U.S. PATENT DOCUMENTS

| | | | | |
|---|---|---|---|---|
| 4,965,830 | A * | 10/1990 | Barham et al. | 704/226 |
| 5,949,757 | A * | 9/1999 | Katoh et al. | 370/232 |
| 6,480,471 | B1 * | 11/2002 | VanZante et al. | 370/252 |
| 6,728,780 | B1 * | 4/2004 | Hebert | 709/239 |
| 6,748,435 | B1 * | 6/2004 | Wang et al. | 709/225 |
| 6,791,943 | B1 * | 9/2004 | Reynolds | 370/232 |
| 7,221,656 | B1 * | 5/2007 | Aweya et al. | 370/252 |
| 7,324,441 | B1 * | 1/2008 | Kloth et al. | 370/229 |
| 7,444,418 | B2 * | 10/2008 | Chou et al. | 709/231 |
| 2003/0123392 | A1 * | 7/2003 | Ruutu et al. | 370/235 |
| 2004/0095893 | A1 * | 5/2004 | Goringe et al. | 370/252 |
| 2005/0119996 | A1 * | 6/2005 | Ohata et al. | 707/3 |
| 2009/0116402 | A1 * | 5/2009 | Yamasaki | 370/253 |

OTHER PUBLICATIONS

Acharya, Swarup et al., "Congressional Samples for Approximate Answering of Group-By Queries," Information Sciences Research Center, Nov. 30, 1999 (29 pages.).

* cited by examiner

*Primary Examiner*—Kevin C Harper
(74) *Attorney, Agent, or Firm*—Thomas, Kayden, Horstemeyer & Risley, LLP

(57) ABSTRACT

A facility for transmitting data items in a data stream is described. The facility compares the rate at which data items in the data stream are being generated to a threshold rate. When the rate at which data items in the data stream are being generated is no greater than the threshold rate, the facility transmits all of the data items in the data stream to a destination. When the rate at which data items in the data stream are being generated is greater than the threshold rate, the facility transmits only a randomly selected proper subset of the data items in the stream to the destination, such that data items are transmitted to the destination at a rate approximately equal to the threshold rate.

34 Claims, 8 Drawing Sheets

ADAPTIVE DATA STREAM SAMPLING

TECHNICAL FIELD

The described technology is directed to the field of data stream analysis.

BACKGROUND

A data stream is a sequence of data items conveying information. For example, a data stream may represent a sequence of requests from a uniquely identified user, or a data stream may convey information representing the performance of a computing system responding to requests. This information may include, for example, the computing system's response time, load, availability, memory usage, response codes, error codes, packet loss, retransmission, and throughput.

A data stream may be analyzed to produce useful information. For example, a data stream representing a computing system's response time for each request received by the computing system (i.e., the time elapsed between the computing system receiving a request and responding to it) may be analyzed to generate metrics for evaluating the performance of the computing system.

Typically, service providers monitor the status of their networks to ensure that their operational policies (e.g., performance, availability, security) are fulfilled, and to identify and resolve issues that may arise. Data stream analysis is particularly useful in this context. For example, a service provider may determine that it is not satisfying a Service Level Agreement specifying a certain maximum average response time by analyzing a data stream or data streams representing the response time for each service request received.

In conventional monitoring systems, every data item in an analyzed data stream is processed. This approach requires significant resources, and these resources often become overwhelmed as the rate at which the data items are produced by computing systems exceeds the processing capacity of the monitoring system. In the example above, the data production rate for a data stream representing the response time for each request will vary based on the rate at which requests are received by the computing system. To illustrate this point, consider a first computing system that receives ten requests per second and a second computing system that receives one hundred requests per second. The data stream data production rate of the second computing system is ten times the data production rate of the first computing system.

When a monitoring system reaches its processing capacity, it is common for the monitoring system to enter a deferred delivery mode by reducing the rate at which data items are delivered to the monitoring system for processing. This approach often permits the monitoring system to continue processing every data item in the analyzed data stream without becoming overwhelmed.

DETAILED DESCRIPTION

Figure 1:
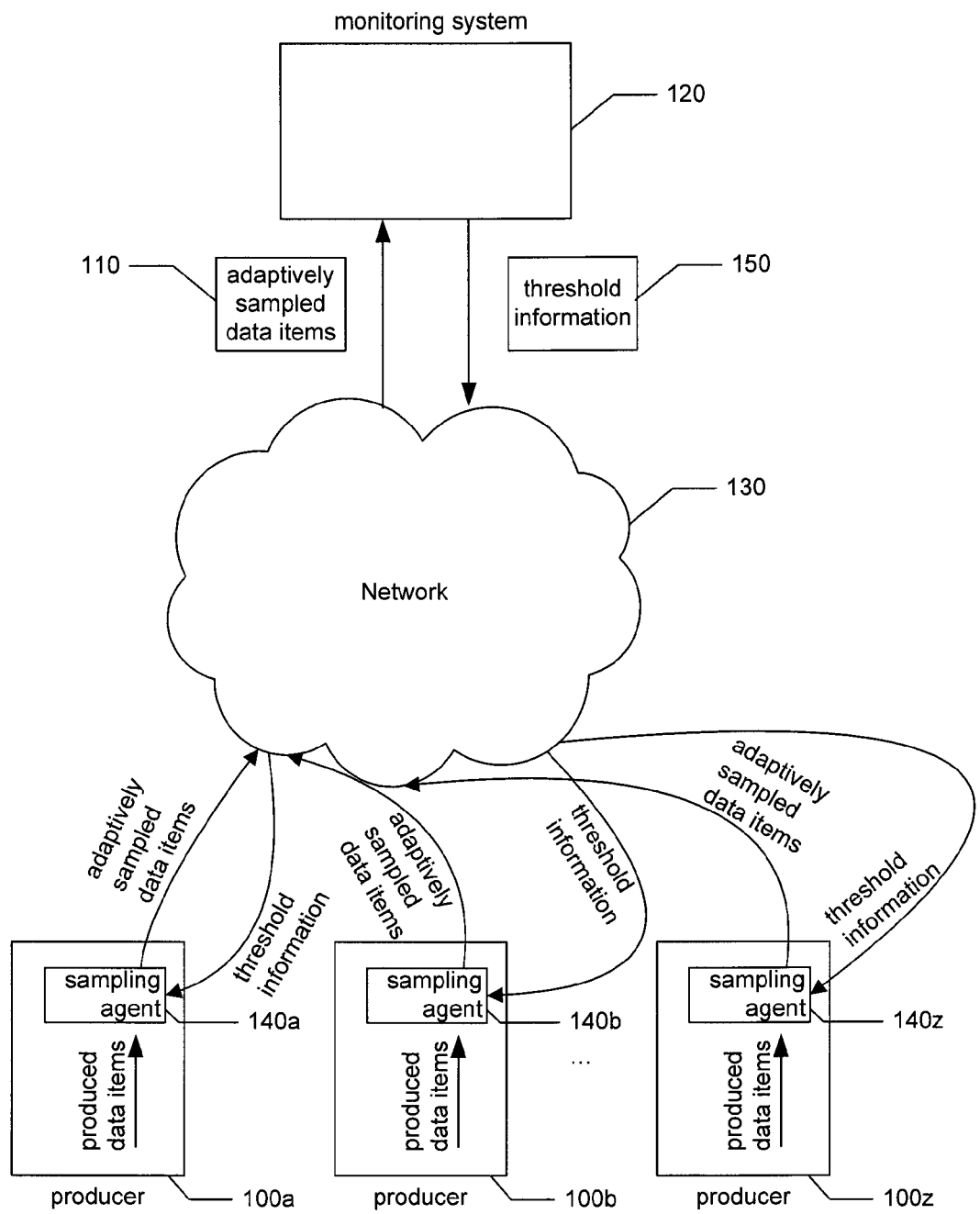
FIG. 1 is a high-level data flow diagram showing data in a typical environment in which the facility operates, in accordance with one or more embodiments.

Applicants have recognized that deferring delivery of data items to reduce the data production rate to one that matches the monitoring system's processing capacity results in untimely monitoring because the data items are not processed for analysis promptly after being produced. Accordingly, an approach to analyze data items without deferring delivery has been developed.

A software facility for analyzing data streams, such as data streams of time series data items, ("the facility") is described. In some embodiments, the facility includes one or more computing systems that produce data streams, sometimes referred to as "producers." For example, a producer may correspond to one or more web servers of a service provider that are responsible for accepting and responding to requests. In some embodiments, the facility includes a monitoring system for processing data streams. For example, a monitoring system may process data streams representing the response time for each request received by a web server to generate metrics for evaluating the performance of the web server. In some embodiments, the facility includes a data store for storing information conveyed by each analyzed data stream.

Typically, the processing capacity of the monitoring system is predetermined. In some embodiments, the facility regulates the amount of data conveyed in each analyzed data stream to ensure that the processing capacity of the monitoring system is not exceeded. For example, the facility may regulate the amount of data conveyed in each analyzed data stream by operating a sampling agent on each producer. A sampling agent at each producer imposes one or more threshold data transmission rates ("threshold rates") on its producer that establish a maximum rate at which data is to be conveyed from that producer to the monitoring system.

In some embodiments, diverse threshold rates may be imposed for each producer. For example, in a facility comprising two producers and a monitoring system having a processing capacity of 36 items/sec., a threshold rate of 18 items/sec. may be imposed on each producer. Alternatively, a threshold rate of 4 items/sec. may be imposed on one producer and a threshold rate of 32 items/sec. may be imposed on the other producer. The sum of each producer's threshold rate may or may not equal the processing capacity of the monitoring system. Indeed, it may be advantageous in some cases to overbook the processing capacity of the monitoring system. For example, it may be advantageous in cases where each producer's threshold rate is rarely imposed at the time. In some embodiments, threshold rates are imposed dynamically by the facility.

In some embodiments, the facility samples an analyzed data stream to regulate the amount of data conveyed in the analyzed data stream. When a producer's data production rate exceeds an imposed threshold rate, the facility samples the analyzed data stream by discarding data items from it so that the data production rate no longer exceeds the imposed threshold rate. In some embodiments, the facility samples the analyzed data stream before it is conveyed to the monitoring system so that the amount of data conveyed to the monitoring system does not exceed the producers imposed threshold rate. By sampling analyzed data streams instead of reducing the rate at which data items are delivered to the monitoring system for processing, the facility analyzes data items promptly after they are produced.

In some embodiments, every data item in an analyzed data stream has the same probability of being discarded. In some embodiments, the probability of a data item being discarded may be based on the frequency of data items of the same type within the analyzed data stream. For example, the facility may maintain a list of requests received by a producer and their frequency of occurrence. In this example, when the producer's data production rate exceeds an imposed threshold rate, the facility discards data items derived from frequent requests at a higher rate than data items derived from rare requests. In some embodiments, certain types of data items are designated as protected, and these item types are not sampled. For example, data items indicating the presence of an alarm or error may correspond to protected item types. By considering the type of information conveyed by each data item of an analyzed data stream, the facility reduces the amount of data processed without significantly affecting the accuracy or timeliness of information conveyed.

In some embodiments, the facility maintains a list of requests received by a group of producers and their frequency of occurrence across the analyzed data streams of the group of producers. When the data production rate of a producer from the group of producers exceeds an imposed threshold rate, the facility discards data items produced for requests of types that are frequent across the data stream of the group at a higher rate than data items derived from requests of types that are rare across the data stream of the group, regardless of the actual frequency of each request type received by the producer whose data stream is being sampled.

In some embodiments, the threshold rates of one or more producers are configurable by the facility or the administrators of the producers individually. For example, an administrator of a producer may determine that the data production rate of the producer rarely reaches its threshold rate. In this example, the administrator may use a configuration service provided by the facility to reduce the producer's threshold rate. In some embodiments, the facility charges each administrator of each producer or group of producers based on their threshold rates or the amount of information being conveyed to the monitoring system. By charging administrators in this fashion, the facility may provide incentive for an administrator to select a lower threshold rate.

By sampling data streams in some or all of the ways identified above, the facility analyzes data items promptly, without exceeding the processing capacity of the monitoring system, and without sacrificing the accuracy of the information conveyed.

FIG. 1 is a high-level data flow diagram showing data flow in a typical environment in which the facility operates. A number of computer systems 100a, 100b, . . . 100z, sometimes referred to as "producers," generate and transmit data items 110 in a data stream to a monitoring system 120 via a network 130 such as the Internet or a local area network. In some embodiments, producers 100a, 100b, . . . 100z are physically distinct computer systems. For example, producers 100a, 100b, . . . 100z may correspond to one or more web servers of a service provider that are responsible for accepting and responding to a number of requests. In some embodiments, producers 100a, 100b, . . . 100z are virtual machines executing on one or more computer systems. For example, producers 100b and 100z may correspond to web server virtual machines executing on a single computer system. Sampling agents 140a, 140b, . . . 140z establish a maximum data transmission rate ("threshold rate") at which data items are to be transmitted by producers 100a, 100b, . . . 100z to monitoring system 120. Typically, sampling agents 140a, 140b, . . . 140z establish these threshold rates based on threshold information 150 conveyed by monitoring system 120. For example, threshold information 150 may indicate the rate at which monitoring system 130 can process data items 110 produced by producers 100a, 100b, . . . 100z. Data items 110 typically include information produced producers 100a, 100b, . . . 100z. For example, data items 110 may include performance information, such as the response time, load, availability, memory usage, response codes, error codes, packet loss, retransmission, and/or throughput of producer 100z. Within the monitoring system 120, data items 110 may be analyzed to generate metrics for evaluating the performance of producers 100a, 100b, . . . 100z.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other devices may be used in place of the producers 100a, 100b, . . . 100z, such as application servers, communications servers, database server, proxy servers, file servers, game servers, emulators, etc.

Figure 2:
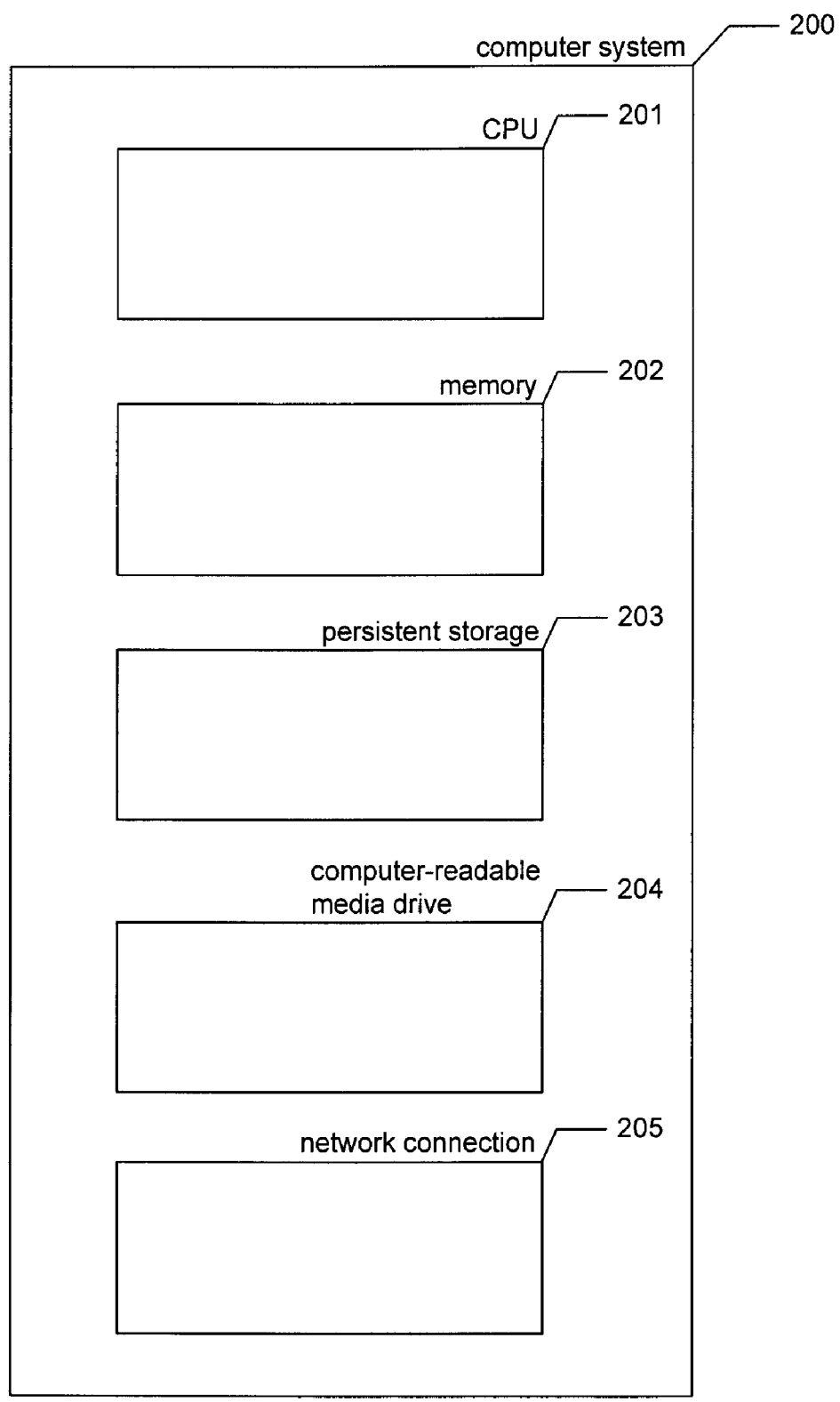
FIG. 2 is a high-level block diagram showing some of the components typically incorporated in at least some of the computer systems and other devices on which the facility executes, in accordance with one or more embodiments.

FIG. 2 is a high-level block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet. While computer systems configured as described above are typically used to support the operation of the facility, those skilled in the art will appreciate that the facility may be implemented using devices of various types and configurations, and having various components.

Figure 3:
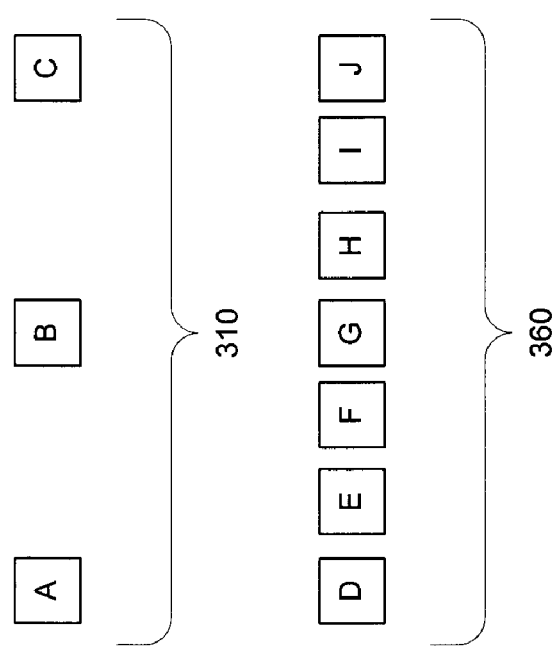
FIG. 3 is a block diagraph showing a data stream on which the facility operates, in accordance with one or more embodiments.
Figure 3:
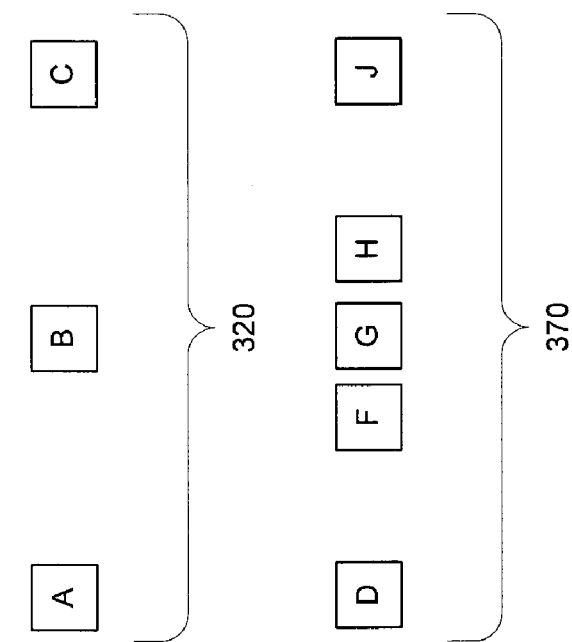

FIG. 3 is a block diagraph showing a data stream on which the facility operates. In particular, the diagram shows the operation of the facility with respect to two portions of the same data stream produced in two different 1-second time intervals. Portion 310 is produced in a first time interval during which the stream has a data production rate of 3 items per second, while portion 360 is produced in a second time interval during which the stream has a data production rate of seven items per second. For each time interval, the facility determines whether the data production rate exceeds a threshold rate. In the example shown in FIG. 3, the threshold rate is 5 items per time interval. During the first time interval, the data production rate does not exceed the threshold rate, so the facility transmits all of the data items in the produced data stream portion to monitoring system 120 as transmitted data stream portion 320. During the second time interval, the data production rate exceeds the threshold rate. As shown, when the data production rate exceeds threshold rate, the facility samples the data stream before transmitting the data items in the produced data stream portion to monitoring system 120 as transmitted data stream portion 370, so that the data items are transmitted at a rate approximately equal to the threshold rate.

Figure 4:
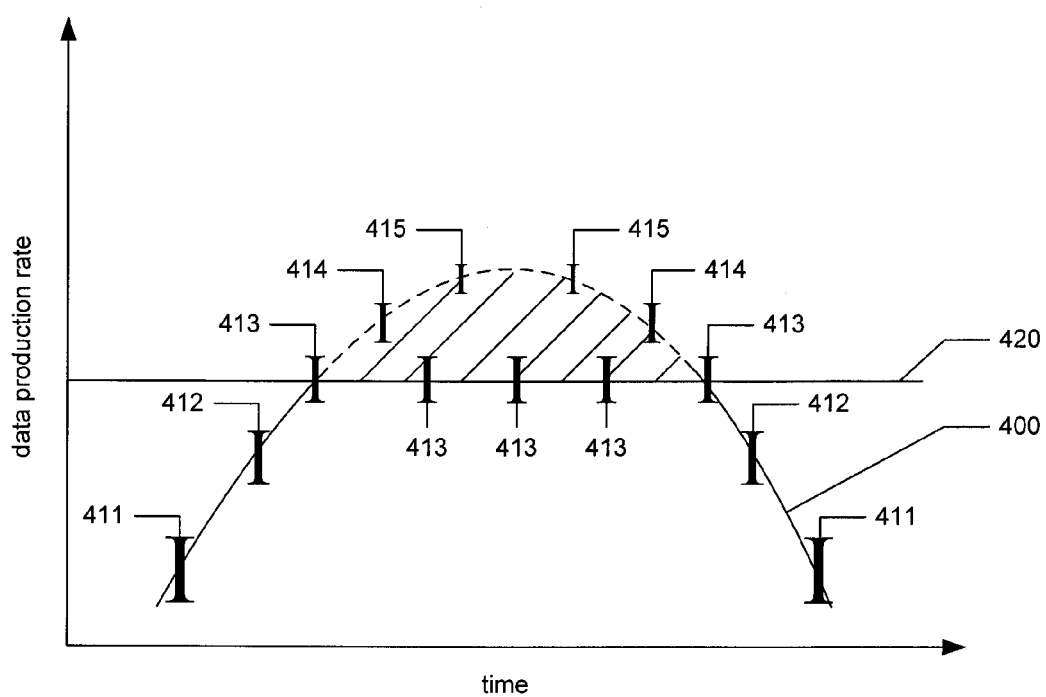
FIG. 4 is a graph showing the relative error introduced by sampling a data stream at a threshold rate, in accordance with one or more embodiments.

FIG. 4 is a graph showing the relative error introduced by sampling a data stream at a threshold rate. Typically, there is intrinsic error in metrics generated from data that has a random component. This error exists regardless of whether the data is sampled. For example, the data production rate of a data stream representing the response time for each request received by a producer varies unpredictably based on the number of requests received. Thus, there is intrinsic error in any metric generated by analyzing the data stream.

The graph in FIG. 4 shows a curve 400 corresponding to a rate at which data items in a data stream are being produced ("the data production rate"). In particular, the curve shows via error bars 411-415 error rates observed when analyzing an unsampled data stream having a variable data production rate matching its height. Error rates 411-415 vary based on the number of data items in the data stream. Specifically, the error rate is high when the data production rate is low (e.g., error rate 411), and the error rate is low when the data production rate is high (e.g., error rate 415). The error observed in analyzing an unsampled data stream is attributable to relative uncertainty, or "jitter."

As an example of a data stream corresponding to the shown curve, monitoring system 120 may analyze transmitted data items representing the response time for each request received by producer 100z to determine whether producer 100z satisfies a maximum response time specified in a Service Level Agreement. If the average request rate of producer 100z is λ per second, then the probability P(k) that k responses will be transmitted satisfying the maximum response time in any given second may be illustrated by the Poisson distribution:

$$P(k) = \frac{\lambda^k}{k!} e^{-\lambda}$$

The average of this distribution is λ and the standard deviation is $\sqrt{\lambda}$.

$$\text{request rate} = \lambda \pm \sqrt{\lambda} = \lambda\left(1 \pm \frac{1}{\sqrt{\lambda}}\right)$$

Thus, the relative uncertainty in the request rate is $1/\sqrt{\lambda}$, which increases as the request rate decreases. For example, if the average request rate is 10,000 requests per second, then the expected jitter is $\sqrt{10,000}=100$ requests per second (1% relative uncertainty). Therefore, when generating metrics by analyzing data streams having variable data production rates, jitter introduces some level of uncertainty into the results of the analysis irrespective of whether the data stream is sampled.

In some embodiments, the facility determines an acceptable relative error and determines the data analysis rate to which it corresponds. For example, the facility may determine that error rate 413 is an acceptable relative error because it cannot afford the processing resources required to reduce its error rate to error rate 415, or because the benefits of error rate 414 are not worth the additional expense. In this example, the facility establishes a threshold rate 420, causing the facility to discard any portion of the data production rate that exceeds this threshold rate. The relative error observed when sampling a data stream at threshold rate 420 is the same as the error observed when analyzing an unsampled data stream whose data production rate is equal to the threshold rate. For example, when the threshold rate is 500 items/sec., a data stream comprising 1,000 data items is sampled at 50%, and the resulting sampling error is $1/\sqrt{1000 \times 0.5} \approx 3.2\%$. By establishing threshold rate 420, sampling only introduces additional errors only when the data production rate exceeds threshold rate 420. Thus, the facility only discards data items when they are least necessary.

Indeed, sampling a stream having a high production rate often introduces little additional error. For example, if data items having an average request rate of 10,000 requests per second are sampled at the rate of p=50%, then the error rate before sampling is $1/\sqrt{10,000}=1\%$, and the error rate after sampling is $1/\sqrt{10,000 \times 0.5}=1.4\%$, assuming a uniform distribution of the types of data items being sampled.

Because a sampled data stream may include any number of item types, uniform random sampling may introduce significant error for rare item types. The facility ameliorates such rare item type error as described further below in connection with FIGS. 7 and 8.

Figure 5:
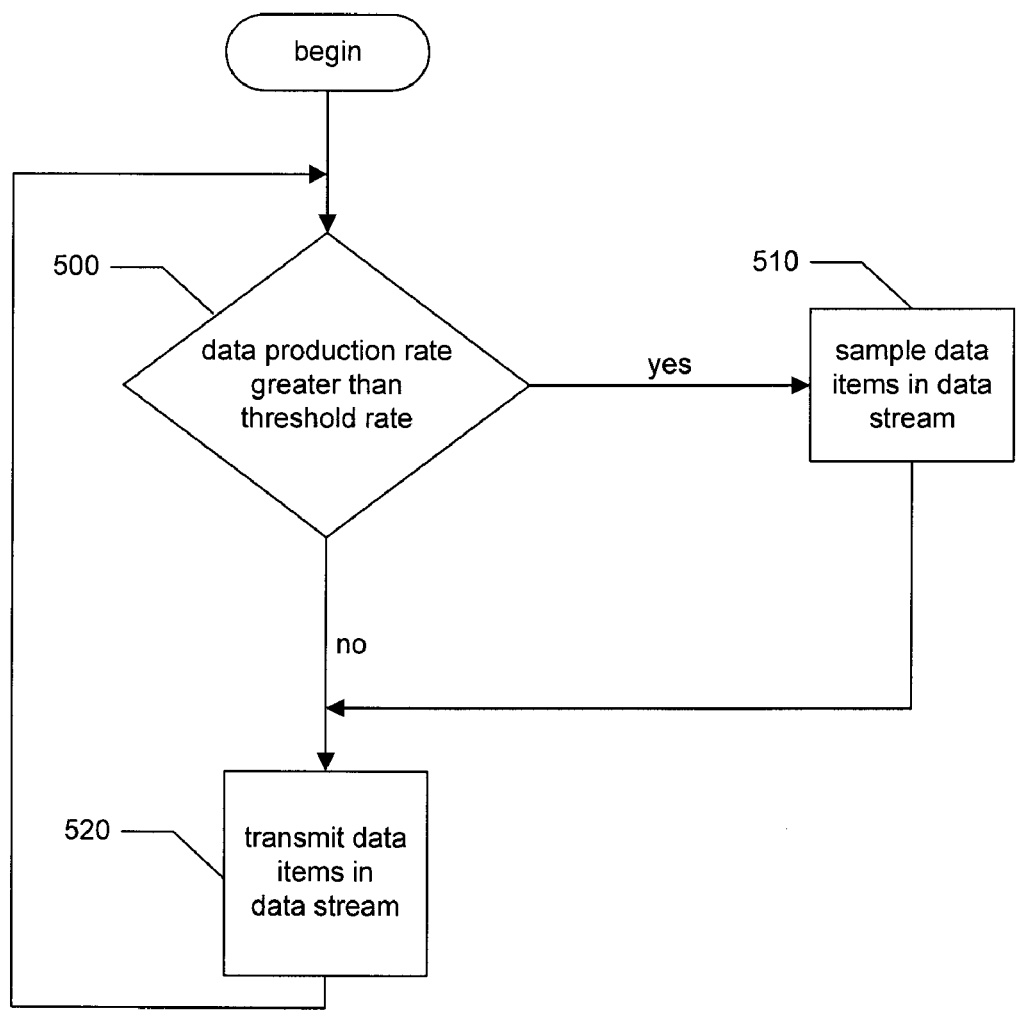
FIG. 5 is a flow diagram showing actions typically performed by the facility when transmitting a data stream having a variable data production rate, in accordance with one or more embodiments.

FIG. 5 is a flow diagram showing actions typically performed by the facility when transmitting a data stream having a variable data production rate. The facility typically performs these actions in a monitoring agent operating on the producer that is producing an analyzed data stream. At block 500, the facility compares the data production rate of an analyzed data stream to a threshold rate. When the data production rate of the data stream is no greater than the threshold rate, the facility transmits all of the data items in the data stream to a destination at block 520. When the data production rate is greater than the threshold rate, the facility samples the data stream at block 510 before transmitting the data items in the data stream to the destination at block 520. After block 520, the facility returns to block 500 and the data production rate of the analyzed data stream to a threshold rate. In some embodiments, threshold rates are imposed dynamically by the facility. For example, when the facility determines that the capacity processing rate of monitoring system 120 has changed, the facility may adjust the threshold rates attributed to one or more of producers 100a, 100b, . . . 100z. In some embodiments, the producer may use a configuration service provided by the facility to adjust its threshold rate.

Those skilled in the art will appreciated that the blocks shown in FIG. 5 and in each of the flow diagrams discussed may be altered in a variety of ways. For example, the order of blocks may be rearranged; substeps may be performed in parallel; shown blocks may be omitted; or other blocks may be included; etc.

In some embodiments, when the sum of each producer's data production rate is below a particular data production rate, the facility may temporarily "turn off" sampling and transmit all data items in a data stream regardless of whether the producer's data production rate exceeds its threshold rate. For example, this may occur when the facility determines that the monitoring system is not in jeopardy of being overwhelmed because only a small amount of the processing capacity is in use. In these instances, the facility will "turn on" sampling when it determines that the processing load of the monitoring system has exceeded a triggering threshold, typically established as a fraction of the monitoring system's capacity processing rate.

Figure 6:
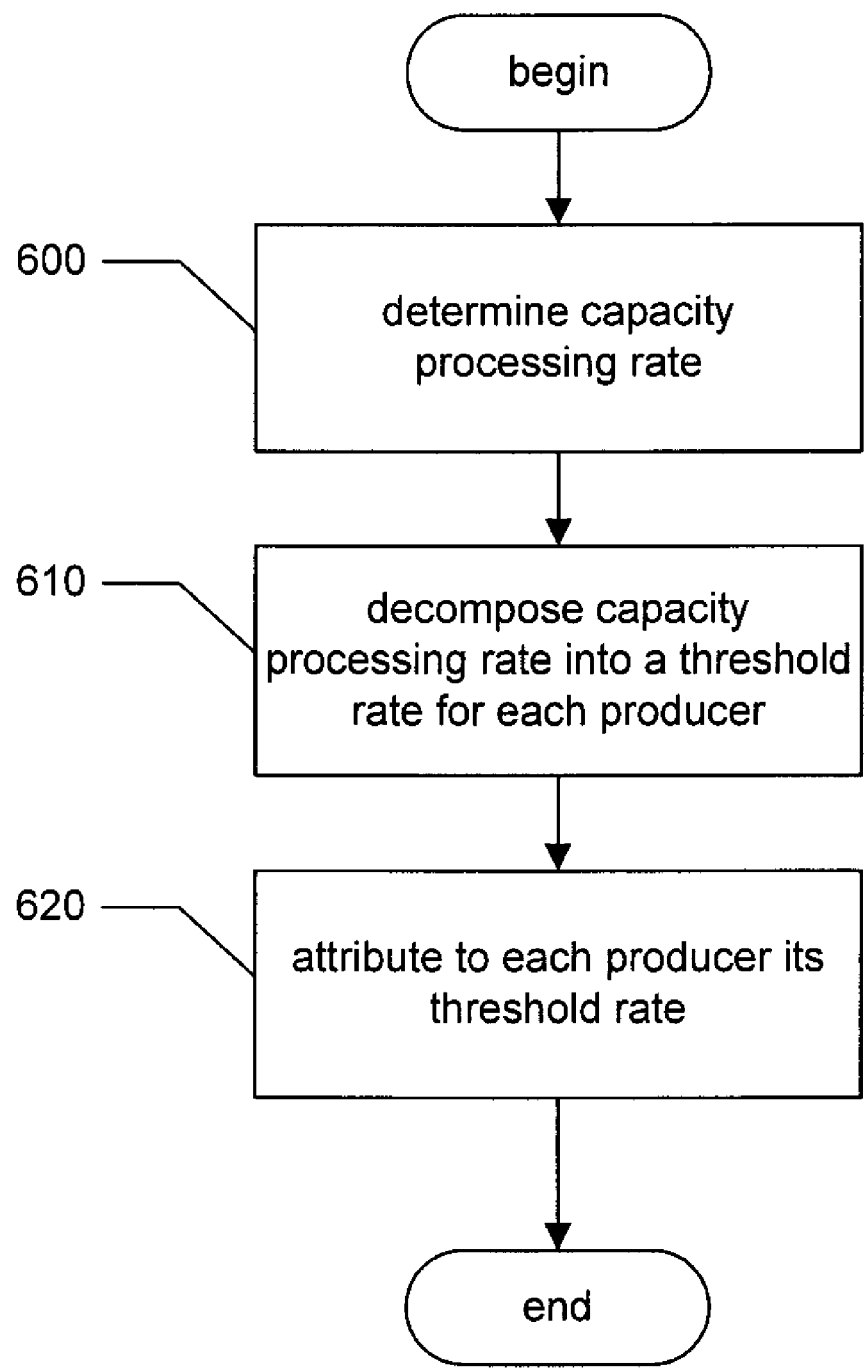
FIG. 6 is a flow diagram showing actions typically performed by the facility in order to establish a threshold rate, in accordance with one or more embodiments.

FIG. 6 is a flow diagram showing actions typically performed by the facility in order to establish a threshold rate. At block 600, the facility determines the capacity processing rate of the destination to which data streams are transmitted, such as monitoring system 120. In some embodiments, the capacity processing rate is the rate at which transmitted data items may be processed by the receiver. Typically, the capacity processing rate is predetermined and is based on the types of processing involved and resources available for processing transmitted data items.

At block 610, the facility decomposes the capacity processing rate into a number of threshold processing rates for each producer. For example, the facility may partition the capacity processing rate of monitoring system 120 into a number of threshold rates corresponding to producers 100*a*, 100*b*, . . . 100*z*. The sum of each producer's threshold rate may or may not equal the processing capacity rate. For example, in cases where producers' data production rates rarely exceed their threshold rates, it may be advantageous to "overbook" the processing capacity of the processing system by determining producer threshold rates that sum to a rate greater than the capacity processing rate.

In some embodiments, the capacity processing rate is divided equally among the producers. For example, if the processing capacity of monitoring system 120 is 90 items/sec., the capacity processing rate may be decomposed into three threshold rates of 30 items/sec. corresponding to producers 100*a*, 100*b*, and 100*z*. In some embodiments, the capacity processing rate is decomposed into diverse threshold rates. For example, it may be advantageous to attribute a larger threshold rate to producer 100*b* in cases where producers' 100*a* and 100*z* data production rate rarely exceeds their threshold rates; where producer 100*b* is producing a large number of protected data items; or where producer 100*b* has agreed to pay more for a higher threshold rate; etc. In this example, producer 100*b* may be attributed a threshold rate of 50 items/sec. and producers 100*a* and 100*z* may each be attributed a threshold rate of 20 items/sec.

In some embodiments, the capacity processing rate is decomposed in threshold rates based on the applications or services provided by groups of producers. A threshold rate attributed to a group of producers may then by decomposed and attributed to the producers within the group. Regardless of whether the division is between producers or groups of producers, the processing capacity may be divided equally or diversely. For example, where producer 100*b* corresponds to a first application and producers 100*a* and 100*z* correspond to a second application, the capacity processing rate of monitoring system 120 may be decomposed first based on the number of applications. In this example, assuming an equally attributed processing capacity of 1,000 items/sec., producer 100*b* is attributed a threshold rate of 500 items/sec. on behalf of the first application and the group of producers (100*a* and 100*z*) is attributed a threshold rate of 500 items/sec. on behalf of the second application, which is further attributed individually to producers 100*a* and 100*z*. Also, in some embodiments, the capacity processing rate is decomposed into item type thresholds. These thresholds may be attributed uniformly to a group of producers or to producers individually.

At block 620, the facility attributes to each producer its threshold processing rate. In some embodiments, the facility attributes a threshold rate to each producer by distributing the threshold rate to a sampling agent operating on the producer, such as sampling agents 140*a*, 140*b*, . . . 140*z*. The sampling agent may impose the threshold rate attributed to the producer, so that when the producer's data production rate is greater than its threshold rate, the sampling agent discards data items in the data stream before transmitting the data stream. After block 620, these blocks conclude.

In some embodiments, every data item in an analyzed data stream has the same probability of being discarded. However, as discussed above in connection with FIG. 3, jitter introduced by sampling worsens as the number of data items in a data stream having a variable data production rate decreases. Similarly, sampling may introduce large jitter in the value of a metric corresponding to a rare item type. Thus, in some embodiments, item types corresponding to a large number of data items may be sampled at a higher rate than item types corresponding to rare data items. In some embodiments, the facility designates certain item types as protected, such as error or alarm item types. Also, rare item types may be designated as protected in some cases. In some embodiments, only non-protected item types are discarded from a sampled data stream.

Figure 7:
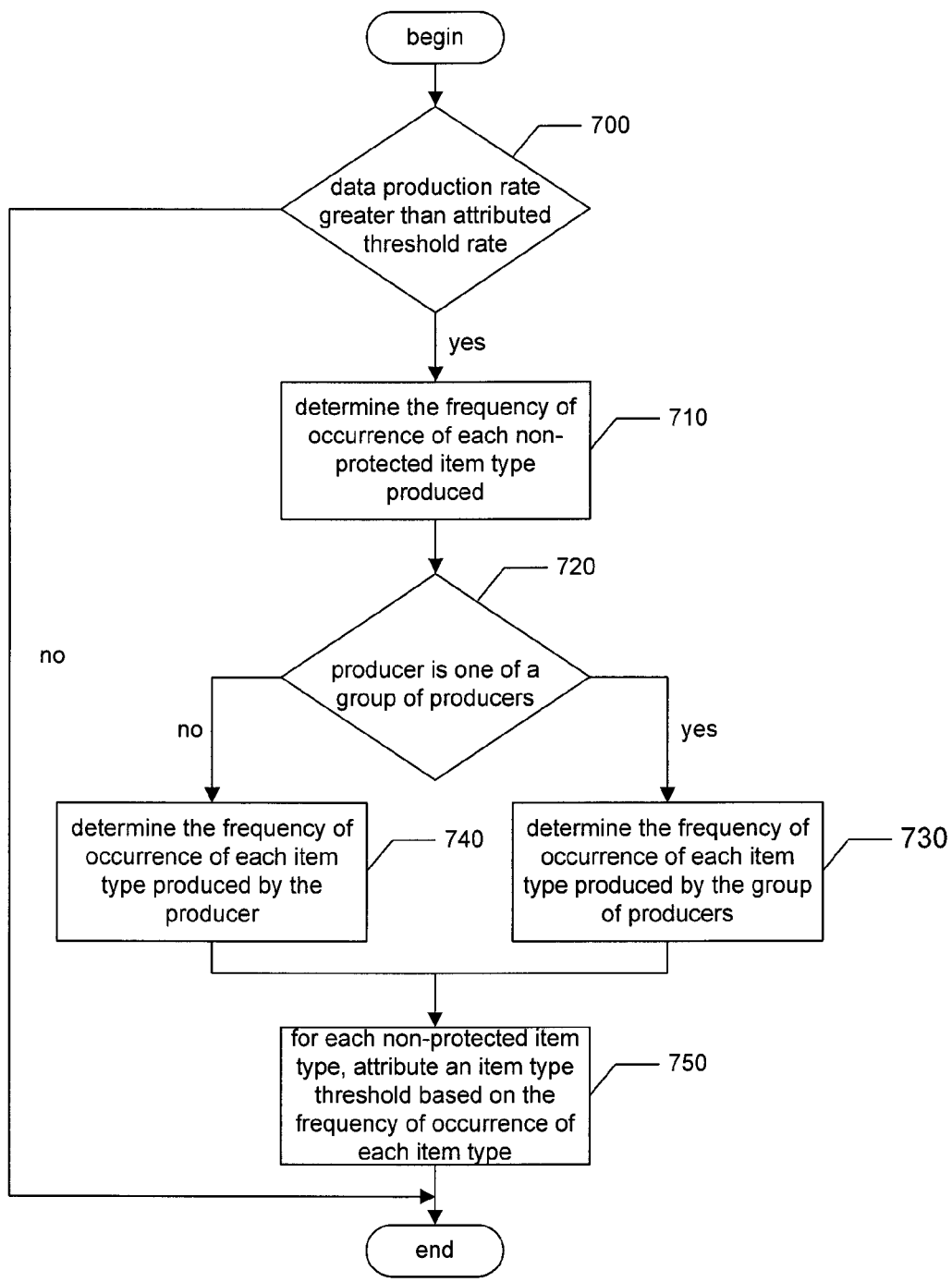
FIG. 7 is a flow diagram showing actions typically performed by the facility in order to rebalance a sampled data stream containing a number of item types, in accordance with one or more embodiments.

FIG. 7 is a flow diagram showing actions typically performed by the facility in order to rebalance a sampled data stream containing a number of item types. At block 700, the facility determines whether a producer's data production rate is greater than its threshold rate. If the facility determines that the producer's data production rate is greater than its threshold rate, then the facility continues to block 710, else the facility returns. At block 710, the facility determines the frequency of occurrence of each non-protected item type produced by the producer. At block 720, the facility determines whether the producer is part of a group of producers. For example, producers 100*a* and 100*z* may be considered a group of producers if they are responsible for receiving and responding to requests for a particular service. Producer groups may also be designated by an administrator of the facility, and need not correspond to particular services or applications. If the facility determines that the producer is part of a group of producers, the facility continues to block 730 to determine the frequency of occurrence of each item type produced by any of the producers in the group of producers, else the facility continues to block 740 to determine the frequency of occurrence of each item type produced by the producer.

At block 750, for each non-protected item type, the facility attributes an item threshold based on the frequency of occurrence of each item type. In some embodiments, the facility also groups item types having the same or similar frequencies of occurrence together, such that those item types are sampled as a group. By assigning an item type threshold, the facility may discard data items based on the frequency of occurrence of their item type. Thus, the facility reduces the amount of data processed without significantly affecting the accuracy or timeliness of the information conveyed. After block 750, the routine concludes.

Figure 8:
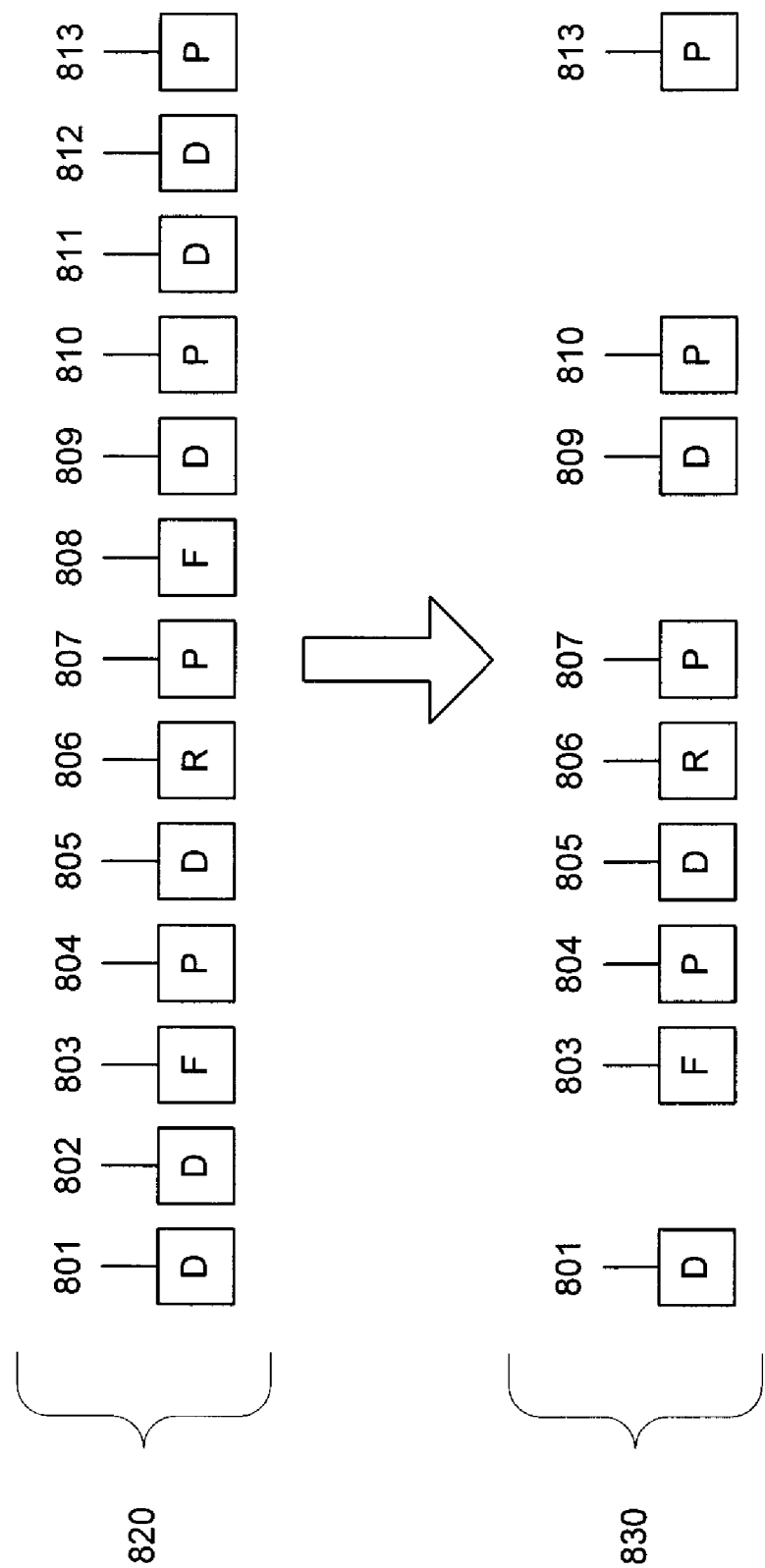
FIG. 8 is a block diagram showing a data stream having a number of types of data items on which the facility operates, in accordance with one or more embodiments.

FIG. 8 is a block diagram showing a produced data stream portion 820 of data items 801-813 each having one of four lettered types on which the facility operates, as well as a corresponding sampled data stream portion 820 that is transmitted to the monitoring system by the facility. For a producer (or group of producers), data items corresponding to item types D and F are produced frequently. In some cases, only a handful of requests dominate the total number of requests for a service. For example, item types D and F may correspond to data items produced by validating a session. Data items corresponding to item type P are protected, and data items corresponding to item type R are produced infrequently. As shown in FIG. 8, when the facility determines that the data production rate for produced stream 810 is greater than a threshold rate, the facility discards non-protected data items in the produced data stream 810 based on the frequency of occurrence of each item type. In this example, because data items having item types D and F are produced frequently (and have nearly the same frequency of occurrence), the facility strongly samples data items of item types D and F, discarding three of the six produced data items of type D and one of the two produced data items of type F. In contrast, because data items having item type R are produced infrequently, the facility weakly samples data items of item type R, failing to discard the one produced data item of this type. Also, in this example, the facility only samples data items having non-protected item types. Thus, data items of item type P are not sampled, such that all four of the data items of this type are retained.

In some embodiments, the facility may determine that the certain producers' data production rates frequently exceed their threshold rates while other producers' data production rates rarely exceed their threshold rates. For example, a capacity processing rate may be divided evenly among producers 100a, 100b, . . . 100z, yet producer 100b receives twice the number of requests as producers 100a and 100z receive combined. In these cases, the facility may rebalance the distribution of the capacity processing rate so that producers 100a, 100b, . . . 100z receive shares of the processing capacity that are proportional to their data production rates.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A non-transitory computer-readable medium whose contents cause a computing system to perform a method for transmitting a plurality of time series data items, the method comprising:
    comparing a rate at which the time series data items in a data stream are being generated to a threshold rate, the time series data items being generated by a plurality of computer systems;
    when the rate at which the time series data items in the data stream are being generated is no greater than the threshold rate, transmitting all the time series data items in the data stream to a monitoring system, the monitoring system being configured to analyze the time series data items to generate at least one system performance metric for each respective one of the computer systems; and
    when the rate at which the time series data items in the data stream are being generated is greater than the threshold rate, transmitting only a proper subset of the time series data items in the data stream to the monitoring system, such that the time series data items are transmitted at a rate approximately equal to the threshold rate;
    wherein the proper subset includes all of the time series data items corresponding to a protected item type, and the system performance metrics generated by analyzing the proper subset are different from system performance metrics that would have been generated had any of the time series data items corresponding to the protected item type been excluded from the proper subset.

2. The non-transitory computer-readable medium of claim 1 wherein the performance metrics obtained differ from performance metrics that would be obtained by processing all of the generated time series data items to less than a predetermined degree.

3. The non-transitory computer-readable medium of claim 1 wherein each one of the plurality of computer systems has a data production rate corresponding to a rate at which items are being produced.

4. The non-transitory computer-readable medium of claim 3 wherein the monitoring system monitors the time series data items at rates up to a capacity monitoring rate;
    the method further comprising:
        determining the threshold rate based on the capacity monitoring rate of the monitoring system; and
        attributing an individual threshold rate to each of the plurality of computer systems based on the capacity monitoring rate of the monitoring system;
    wherein the element of comparing comprises:
        for each of the plurality of computer systems,
            determining the individual threshold rate;
            comparing the data production rate to the individual threshold rate;
            when the data production rate is no greater than the individual threshold rate, transmitting the time series data items in the data stream to the monitoring system; and
            when the data production rate is greater than the individual threshold rate, transmitting only a proper subset of the time series data items in the data stream to the monitoring system, such that the time series data items are transmitted at a rate approximately equal to the individual threshold rate.

5. The non-transitory computer-readable medium of claim 4 wherein the sum of each individual threshold rate for each of the plurality of computer systems is equal to the capacity monitoring rate of the monitoring system.

6. The non-transitory computer-readable medium of claim 1 wherein the time series data items are of a plurality of item types;
    the method further comprising:
        determining a frequency of occurrence of each of the plurality of item types; and
        determining the proper subset based on the frequency of occurrence of each of the plurality of item types.

7. The non-transitory computer-readable medium of claim 6 wherein the time series data items of item types having a low frequency of occurrence are more likely to be included in the proper subset than the time series data items of item types having a high frequency of occurrence.

8. The non-transitory computer-readable medium of claim 6 wherein the method further comprises, for each item type, monitoring the transmitted time series data items of the item types to obtain at least one metric for the item type, and wherein, for each item type, the at least one metric obtained for the item type differ from at least one metric that would be obtained by monitoring all of the generated time series data items of the item type to less than a predetermined degree.

9. The non-transitory computer-readable medium of claim 1 wherein the time series data items are of a plurality of item types and wherein the plurality of items types includes at least one protected item type, so that when the rate at which the time series data items in the data stream are being generated is greater than the threshold rate, every time series data item corresponding to the protected item type is included in the proper subset of the time series data items in the data stream being transmitted to the monitoring system irrespective of whether the rate at which the time series data items in the data stream are being generated is greater than the threshold rate.

10. A non-transitory computer-readable medium whose contents cause a computing system to perform a method for transmitting a plurality of time series data items, the method comprising:

comparing a rate at which the time series data items in a data stream are being generated to a threshold rate;

when the rate at which the time series data items in the data stream are being generated is no greater than the threshold rate, transmitting all the time series data items in the data stream to a destination; and when the rate at which the time series data items in the data stream are being generated is greater than the threshold rate, transmitting only a proper subset of the time series data items in the data stream to the destination, such that the time series data items are transmitted at a rate approximately equal to the threshold rate;

wherein the time series data items are of a plurality of item types and wherein the plurality of items types includes at least one protected item type, so that when the rate at which the time series data items in the data stream are being generated is greater than the threshold rate, every time series data item corresponding to the protected item type is included in the proper subset of the time series data items in the data stream being transmitted to the destination irrespective of whether the rate at which the time series data items in the data stream are being generated is greater than the threshold rate;

wherein the method further comprises, for each item type, processing the transmitted time series data items of the item types to obtain results for the item type, and wherein the result obtained for the protected item type is equal to a result that would be obtained by processing all of the generated time series data items in the data stream.

11. A computing system, comprising:

a monitoring subsystem;

a first producer producing first data items, the first producer having a first data production rate corresponding to a rate at which first items are being produced, wherein the first producer transmits the first data items in a first data stream to the monitoring subsystem by a method, comprising:

comparing the first data production rate to a first threshold rate;

when the first data production rate is no greater than the first threshold rate, transmitting all of the first data items in the first data stream to the monitoring subsystem; and when the first data production rate is greater than the first threshold rate, sampling the first data stream before transmitting a proper subset of the first data items in the first data stream to the monitoring subsystem, such that the first data items are transmitted at a rate approximately equal to the first threshold rate;

wherein the monitoring subsystem is configured to analyze the first data items that have been received to generate at least one system performance metric for the first producer; and wherein the proper subset includes all of the first data items corresponding to a protected item type, and the at least one system performance metric generated by analyzing the proper subset is different from at least one system performance metric that would have been generated had any of the first data items corresponding to the protected item type been excluded from the proper subset.

12. The computing system of claim 11 wherein the comparing and transmitting acts are performed in a first time period, and wherein, in a second time period preceding the first time period, the first data items in the first data stream are all transmitted to the monitoring system irrespective of the first data production rate, and wherein, at a time between the second time period and the first time period, the monitoring system determines that a processing load, based at least in part on the transmitted first data items in the first data stream, has exceeded a triggering threshold.

13. The computing system of claim 11 further comprising a second producer producing a plurality of second data items, the second producer having a second data production rate corresponding to a rate at which the second data items are being produced, wherein the second producer transmits the second data items in a second data stream to the monitoring subsystem by a method, comprising:

comparing the second data production rate to a second threshold rate;

when the second data production rate is no greater than the second threshold rate, transmitting all of the second data items in the second data stream to the monitoring subsystem; and when the second data production rate is greater than the second threshold rate, sampling the second data stream before transmitting the second data items in the second data stream to the monitoring subsystem, such that the second data items are transmitted at a rate approximately equal to the second threshold rate;

wherein the monitoring subsystem is configured to analyze the second data items that have been received to generate at least one performance metric for the second producer.

14. The computing system of claim 13 wherein the first producer responds to requests for a first service of a service provider and the second producer responds to requests for a second service of the service provider.

15. The computing system of claim 13 wherein the monitoring system determines the first threshold rate and the second threshold rate based on a capacity processing rate at which the monitoring system can process transmitted data items.

16. The computing system of claim 15 wherein the first threshold rate is equal to the second threshold rate.

17. The computing system of claim 13 wherein the first threshold rate is configurable by the first producer and the second threshold rate is configurable by the second producer.

18. The computing system of claim 13 wherein the monitoring system changes the first threshold rate and the second threshold rate dynamically based at least in part on a capacity processing rate at which the monitoring system can process transmitted data items.

19. The computing system of claim 13 wherein the sum of the first threshold rate and the second threshold rate exceeds a capacity processing rate at which the monitoring system can process transmitted data items.

20. The computing system of claim 13 wherein the first data items and the second data items are of a plurality of item types; and wherein the acts of sampling the first data stream and sampling the second data stream further comprise:

determining a first frequency of occurrence of each of the plurality of item types of the first data items;

determining a second frequency of occurrence of each of the plurality of items types of the second data items;

sampling the first data items according to the first frequency of occurrence of each of the plurality of item types; and sampling the second data items according to the second frequency of occurrence of each of the plurality of item types.

21. The computing system of claim 13 wherein the first data items and the second data items are of a plurality of item types; and
wherein the act of sampling the first data stream and the act of sampling the second data stream further comprise:
determining a combined frequency of occurrence of each of the plurality of item types of the first data items and the second data items; and
sampling the first data items and the second data items according to the combined frequency of occurrence of each of the plurality of item types.

22. The computing system of claim 21 wherein the first data items and the second data items having a high combined frequency of occurrence are more likely to be sampled than the first data items and the second data items having a low combined frequency of occurrence.

23. The computing system of claim 13 wherein the first data items and the second data items are of a plurality of item types and wherein the plurality of item types includes at least one protected item type, such that the first data items and the second data items of the protected item type are protected from being sampled.

24. A method in a computing system for selectively transmitting data items, comprising:
comparing, in the computing system, a rate at which items in a data stream are being generated to a threshold rate, the items being generated by a plurality of producers;
when the rate at which items in the data stream are being generated is no greater than the threshold rate, transmitting, in the computing system, all items in the data stream to a monitoring system; and
when the rate at which items in the data stream are being generated is greater than the threshold rate, transmitting, in the computing system, only a proper subset of the data items in the stream to the monitoring system, such that the data items are transmitted at a rate approximately equal to the threshold rate;
wherein the monitoring system is configured to store the received data items and to analyze the data items that have been received to generate at least one system performance metric for each of the producers; and
wherein the proper subset includes all of the data items corresponding to a protected item type, and the system performance metrics generated by analyzing the proper subset are different from system performance metrics that would have been generated had any of the data items corresponding to the protected item type been excluded from the proper subset.

25. The method of claim 24 wherein the data items are of a plurality of item types and wherein the proper subset is based at least in part on a frequency of occurrence of each of the plurality of item types, such that the data items of a particular type having a high frequency of occurrence are less likely to be included in the proper subset than the data items of another type having a low frequency of occurrence.

26. The method of claim 24 wherein the acts of comparing and transmitting are performed by the producers, each producer having a data production rate and wherein the method further comprises:
attributing an individual threshold rate to each of the plurality of producers;
for each of the plurality of producers,
comparing the data production rate of the producer to the individual threshold rate of the producer;
when the data production rate of the producer is no greater than the individual threshold rate of the producer, transmitting the data items in the data stream of the producer to the monitoring system; and
when the data production rate of the producer is greater than the individual threshold rate of the producer, transmitting only a randomly selected proper subset of the data items in the data stream of the producer to the monitoring system, such that data items are transmitted at a rate approximately equal to the individual threshold rate of the producer.

27. The method of claim 26 wherein the sum of each individual rate is equal to the threshold rate.

28. The method of claim 26 wherein the plurality of producers include a plurality of virtual machines executing on a single computer system.

29. The method of claim 26 wherein the plurality of producers include a plurality of web servers executing on a single computer system.

30. The method of claim 26 wherein the plurality of producers correspond to processes executing on a single computer system.

31. The method of claim 26 wherein the plurality of producers include a plurality of services.

32. The method of claim 24, wherein the data items include performance information selected from the group consisting of: response time, data throughput, processor load, memory usage, and availability.

33. The non-transitory computer readable medium of claim 1, wherein the proper subset excludes at least one of the time series data items corresponding to a non-protected item type, and the system performance metrics generated by analyzing the proper subset are equal to system performance metrics that would have been generated had the excluded ones of the time series data items corresponding to the non-protected item type been included in the proper subset.

34. The non-transitory computer-readable medium of claim 9, wherein the at least one protected item type corresponds to the data items from the data stream that must be analyzed by the monitoring system in order to generate accurate system performance metrics.

* * * * *

UNITED STATES PATENT AND TRADEMARK OFFICE
CERTIFICATE OF CORRECTION

PATENT NO.       : 7,817,563 B1                                        Page 1 of 1
APPLICATION NO.  : 11/768759
DATED            : October 19, 2010
INVENTOR(S)      : Buragohain et al.

It is certified that error appears in the above-identified patent and that said Letters Patent is hereby corrected as shown below:

Column 11, line 18 (claim 10): delete "items" and replace with --item--.
Column 12, line 64 (claim 20): delete "items" and replace with --item--.

Signed and Sealed this
Twenty-eighth Day of December, 2010

David J. Kappos
*Director of the United States Patent and Trademark Office*